United States Patent [19]

VanSon

[11] Patent Number: 5,096,107
[45] Date of Patent: Mar. 17, 1992

[54] MEANS FOR SECURING AN ENCLOSURE FOR LUGGAGE ON A CARTOP RACK

[76] Inventor: W. Peter VanSon, P.O. Box 11155, St. Petersburg, Fla. 33733

[21] Appl. No.: 628,087

[22] Filed: Dec. 17, 1990

[51] Int. Cl.$^5$ .......................... B60R 9/00; B60R 9/055
[52] U.S. Cl. .................... 224/328; 224/309; 224/314; 224/317; 224/318
[58] Field of Search ............... 224/328, 309, 314, 315, 224/316, 317, 327, 318, 319, 330, 35, 30 R, 30 A, 310, 320, 321, 42.01, 273, 274, 322, 325, 326, 42.11, 34; 24/385

[56] References Cited

U.S. PATENT DOCUMENTS

| | | | |
|---|---|---|---|
| 2,621,836 | 12/1952 | McMiller | 224/328 |
| 3,000,418 | 9/1961 | Bitting | 224/328 |
| 3,000,419 | 9/1961 | Morrison | 224/318 |
| 3,209,971 | 10/1965 | Goodell | 224/319 |
| 3,265,262 | 8/1966 | Motsinger | 224/309 |
| 3,476,162 | 11/1969 | McMiller | 224/315 |
| 3,503,547 | 3/1970 | Shields | 224/319 |
| 3,955,732 | 5/1976 | Böschen | 224/328 |
| 4,433,802 | 2/1984 | Woolf | 224/42.01 |

FOREIGN PATENT DOCUMENTS

| | | | |
|---|---|---|---|
| 552234 | 1/1958 | Canada | 224/328 |
| 1106809 | 8/1981 | Canada | 224/328 |
| 284240 | 11/1952 | Fed. Rep. of Germany | 224/328 |
| 2442104 | 3/1975 | Fed. Rep. of Germany | |
| 2909947 | 9/1980 | Fed. Rep. of Germany | |
| 8404074 | 10/1984 | PCT Int'l Appl. | 224/328 |
| 2041304 | 9/1980 | United Kingdom | 224/328 |

Primary Examiner—Ernest G. Cusick
Assistant Examiner—Keith Kupferschmid
Attorney, Agent, or Firm—Julian C. Renfro

[57] ABSTRACT

An enclosure for luggage for use on a vehicle cartop luggage rack of the type including either front and rear rails disposed in a spaced, parallel relationship, or else an essentially rectangularly shaped frame, mounted generally horizontally on the cartop. This enclosure utilizes rapidly operated securing devices on its front and back panels when intended for use on a two rail rack, or rapidly operated securing devices on all four of its peripheral panels when intended for use with a luggage rack principally constituted by front, back and side rails. In the latter type rack, the subject enclosure for luggage is insertable into the space defined by the four rails. Flexible, watertight material having front and back surfaces as well as side surfaces is used, and an access opening is provided in an upper part of the enclosure. The securing devices utilized on the peripheral surfaces are in each instance disposed at a location approximately coinciding with the position of the respective rail of the frame, and each of these novel securing devices is in the form of a longitudinally-split, sleeve-like member, able to be readily utilized in a rail-encompassing relationship. An effective, rapidly operated closure arrangement, such as a zipper or a series of snaps, is provided on each of these sleeve-like members for enabling the user to easily complete the fastening of each of these members to the respective rail of the frame.

9 Claims, 2 Drawing Sheets

MEANS FOR SECURING AN ENCLOSURE FOR LUGGAGE ON A CARTOP RACK

BACKGROUND OF THE INVENTION

In view of the typical American's desire to travel overland in four wheeled vehicles, the use of cartop carriers, luggage racks and the like has become very popular, so that items too large or too bulky for placement inside the vehicle can be carried along on the journey.

Although the vehicle owner can purchase many different types of luggage racks and cartop carriers for removable installation on the roof of the vehicle, many of today's vehicles come from the factory equipped with cartop luggage racks, with such vehicles typically being station wagons as well as the multipurpose and/or all terrain vehicles, including the Chevrolet S-10 Blazer, the GMC Jimmy S-15, and the like.

Typically, the vehicle owner must go to a considerable amount of trouble if he is to protect luggage from rain and wind damage. A simple approach is of course to place the luggage on the permanently installed luggage rack, then wrap it in a tarpaulin or large sheet of plastic, and thereafter utilize one or more ropes or straps in order to tightly secure the luggage to the rack.

An obvious improvement over such an arrangement is that taught in the Morrison U.S. Pat. No. 3,000,419 entitled "Automobile Luggage Rack Cover," which issued Sept. 19, 1961. In that patent, the patentee taught the use of a container for luggage insertable into the generally rectangular frame mounted horizontally on the vehicle top in vertically spaced relation thereto. Morrison's generally rectangular container has an access opening therein and an endless flap on the container extending horizontally therearound at a location below the opening. Disposed in spaced locations around such endless flap are a number of grommets, into the openings of which one or more ropes can be threaded. Therefore, it is to be seen that a length of rope can be utilized for lashing the endless flap to the bars or rails of the luggage rack or cartop carrier, by passing the rope through one grommet, thence around the bar or rail, thence through another grommet, then around the bar or rail, and so forth until the rope has been utilized around all four sides of Morrison's container.

Although this is clearly a workable approach, it is obviously a tedious procedure, meaning that either installation of the container on the automobile, or the removal of the container therefrom requires a tangible amount of time and effort, that is particular difficult if the user is short of stature.

A somewhat different approach is taught in the Goodell U.S. Pat. No. 3,209,971 entitled "Automobile Top Carrier and Cases Therefor," which issued Oct. 5, 1965. Instead of utilizing a relatively flexible container of canvas or plastic, Goodell utilizes a plurality of complemental cases substantially filling the region bounded by the bars or rails of the cartop carrier. Although these cases are relatively easily installed in the cartop carrier or removed therefrom, they are of fixed size, meaning that anything stored in the several cases must be able to be accommodated therein. This of course would exclude the Goodell arrangement from carrying items that are particularly long or wide. In addition, these cases may well be expensive to produce.

The Motsinger U.S. Pat. No. 3,265,262 entitled "Plastic Bag for Carrying Water on Motor Vehicles," which issued Aug. 9, 1966, represents a novel approach in that it teaches the use of a large plastic bag resting on the top of a motor vehicle. This patentee explains that his arrangement can be utilized whether or not the vehicle is equipped with a luggage rack, with his plastic bag being able to be filled from a hose or the like. Motsinger explains that in the event the vehicle has a luggage rack, several different arrangements can be utilized for attaching the bag to the luggage rack. This obviously is not a teaching that will be generally usable by the public.

The McMiller U.S. Pat. No. 3,476,162 entitled "Latch Mechanism for a Car Top Carrier Door," which issued Nov. 4, 1969, teaches the use of a flexible cover having an opening in one sidewall permitting ready insertion of luggage and removal therefrom, but such invention is apparently confined to the locking elements particularly adapted for use with a readily removable luggage rack.

The Shields U.S. Pat. No. 3,503,547 entitled "Automobile Roof-Top Carrier," which issued Mar. 31, 1970, teaches the use of first and second cover means adapted to overlap the side wall portions and enclose the base compartment, and frictionally engage the side wall portions of the base compartment. The Shields invention represents a very limited teaching that is obviously expensive and that has little application to the general public.

It was to overcome the limitations and disadvantages of these prior art arrangements that the present invention was evolved.

SUMMARY OF THE INVENTION

The present invention involves a novel enclosure intended for use on a vehicle cartop luggage rack of the type including essentially parallel front and back rails, or a generally rectangularly shaped frame mounted essentially horizontally on a cartop in vertically spaced relation thereto. The latter type of prior art type frame is principally constituted by front, back and side rails, thus defining a generally rectangular space on the top of the vehicle.

The novel enclosure for luggage in accordance with this invention is insertable in the space defined by the rails of the frame and is adapted to rest on the cartop. This enclosure is made of flexible, watertight material having front and back surfaces as well as side surfaces, and has an access opening in an upper rear portion of the enclosure.

In accordance with this invention, the enclosure has securing means on front and back surfaces for use with a luggage rack having only front and back rails, or securing means on all four peripheral surfaces, at locations approximately coinciding with each of the four bars of a rectangular frame. Each of these securing means is in the form of a longitudinally-split, sleeve-like member, able to be readily utilized in a rail-encompassing relationship. Provided on each of these sleeve-like members are means for enabling the user to rapidly complete the fastening of the securing means to the respective rail of the frame, and preferably utilize either a long zipper or a series of snaps.

This highly advantageous arrangement makes it readily possible for the user to place my generally rectangular enclosure for luggage onto the top of the vehicle, with the access opening preferably facing rearwardly, with such access opening held in the normally closed condition by the use of an elongate zipper. The sleeve-like members located on the front and back surfaces, or on the four peripheral surfaces of the enclosure can readily be brought into engagement with the adjacent bar or rail of the luggage rack, and by the utilization of the spaced series of snaps, the sleeve-like members can be rapidly converted into a condition in which the respective adjacent rail is encompassed. As an alternative to the spaced series of snaps for fastening the securing means to the rail of the luggage rack, an elongate zipper can be utilized on one or more of the sleeve-like members, so that the user need only to bring abutting edges of the sleeve-like member together, and then operate the tab or operator of the zipper along the length of the sleeve-like member in order to consummate the relationship with the adjacent rail or bar of the rack. In many instances I prefer to use a zipper as the fastening means for all of the securing means used on the enclosure.

As is obvious, this novel arrangement is highly satisfactory for a wide range of purposes, and because of the use of snaps or zippers, the user can complete the installation of the luggage enclosure on the top of the vehicle in a minute or two in most instances, thereby obviating the use of additional straps or ropes of any kind for securing the enclosure to the luggage rack.

It is therefore a principal object of this invention to provide a readily affordable enclosure for luggage for use on a cartop luggage rack, which enclosure can be readily installed or readily removed from the luggage rack, without necessitating the use of ropes, straps or tools of any kind.

It is another object of this invention to provide an enclosure for luggage combining the qualities of ease in mounting with highly effective, appealing design that is attractive as well as having clean aerodynamic lines.

It is still another object of this invention to provide an enclosure for luggage that is of flexible, waterproof and lightweight construction, which utilizes an elongate, sleeve-like member on both the front and back surfaces of the enclosure, or else on all four peripheral surfaces of the enclosure, with each of such sleeve-like members being able to be readily and easily brought into a rail-encompassing relationship with the adjacent rail of a cartop luggage rack.

It is yet still another object of this invention to provide a luggage enclosure of waterproof and lightweight construction, that can be folded into a small volume for easy storage in a small space when not in use, but which can rapidly be deployed and tightly secured to the rails of a cartop luggage rack by the use of snaps and/or zippers, with no tools nor any ropes or straps being needed in order to secure the luggage enclosure to the top of the vehicle.

These and other objects, features and advantages will be more apparent from the enclosed figures of drawing.

DETAILED DESCRIPTION

Figure 1:
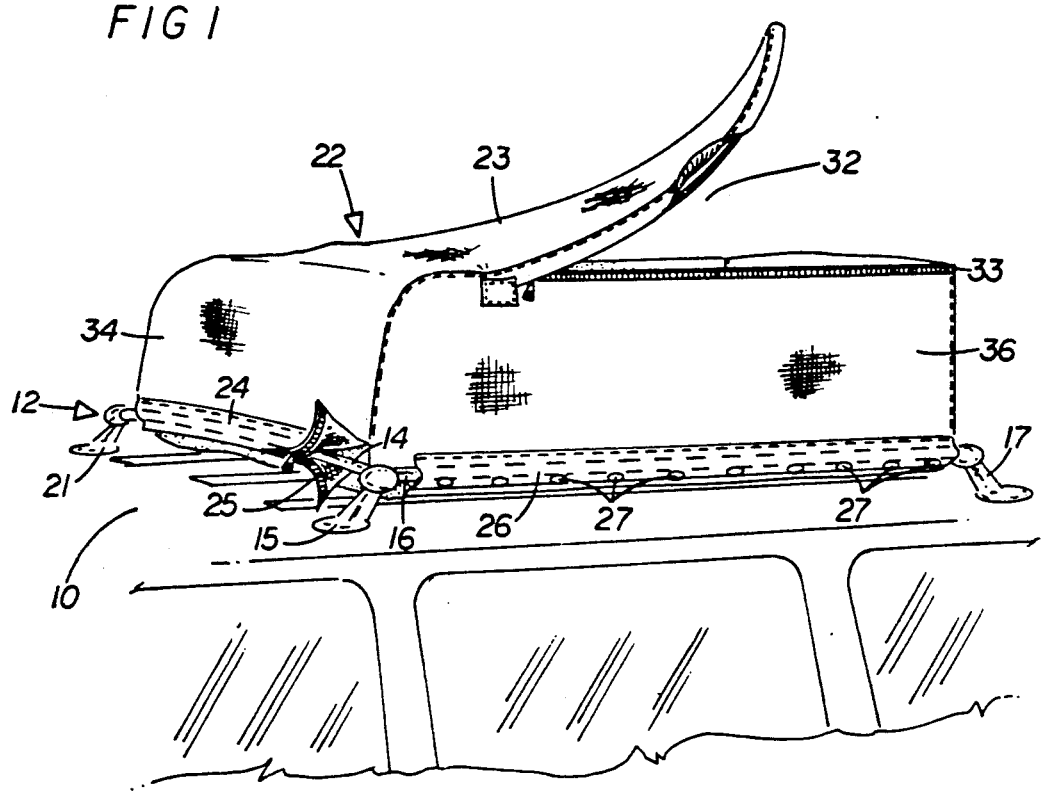
FIG. 1 is a perspective view of an enclosure for luggage in accordance with this invention, utilized in connection with a cartop luggage rack defined by four rails, this view revealing the use of longitudinally-split sleeve-like members on the two vertical surfaces of the enclosure visible in this figure, with a zipper utilized on one sleeve-like member, and a series of snaps utilized on the other sleeve-like member, in order that my novel enclosure can be tightly secured in a readily removable manner to the rails of the luggage rack.

With initial reference to FIG. 1, it will be seen that the top 10 of the vehicle is equipped with a luggage rack 12 made up of front, back and side rails defining an essentially rectangularly shaped frame mounted generally horizontally on the cartop in vertically spaced relation thereto. The portions of the luggage rack 12 visible in FIG. 1 are seen to be made up of a front rail 14 and a side rail 16, whose near ends are supported by a post 15 that is in turn secured to the cartop 10. Similarly, post 17 is utilized at the intersection of the side rail 16 and the rear rail 18, to form a suitable support for the left rear corner of the rack 12. In a like manner, posts 19 and 21 are located at the intersections of the front and rear rails with the side rail on the far side of the rack, to complete the support for the remaining portion of the rack. The lower portion of each of these three posts is secured to the cartop 10.

A generally rectangular enclosure 22 for luggage in accordance with this invention may be readily inserted into the space defined by the four rails of the frame 12, with a certain portion of the weight resting on the cartop. This novel enclosure is of flexible, lightweight yet watertight material having front and back peripheral surfaces as well as side surfaces, and has a top 23 arranged to provide an access opening 32 in an upper rear portion of the enclosure.

Novel securing means are utilized on all four vertically disposed peripheral surfaces, at locations approximately coinciding with the bars or rails of the luggage rack or frame 12, with each of the securing means being in the form of a longitudinally-split, sleeve-like member. In FIG. 1 it will be noted that sleeve-like member 24 is positioned on the lower portion of the front surface 34 of the enclosure 22, with the placement of sleeve-like member 24 coinciding with the front rail 14 of the luggage rack 12.

The sleeve-like member 24 is longitudinally split, and is equipped with a zipper 25, such that the user is enabled to rapidly complete the fastening of the sleeve-like member 24 to the front rail 14 of the rack merely by bringing together the two parts of the sleeve-like member at one end, starting the zipper properly, and then sliding the tab or operator of the zipper for the length of the sleeve-like member 24.

I am not to be limited to the use of a zipper for converting the sleeve-like members into rail-encompassing relationships, for also revealed in FIG. 1 is the sleeve-like member 26 that is located on the lower portion of the side surface 36 of the enclosure 22. The sleeve-like member 26 is equipped with a series of snaps 27 enabling the user to rapidly complete the fastening of the sleeve-like member 26 around the respective side rail 16 on the left side of the luggage rack. The placement of the sleeve-like member 26 on the side surface 36 is obviously such as to closely coincide with the position of the side rail 16.

Figure 2:
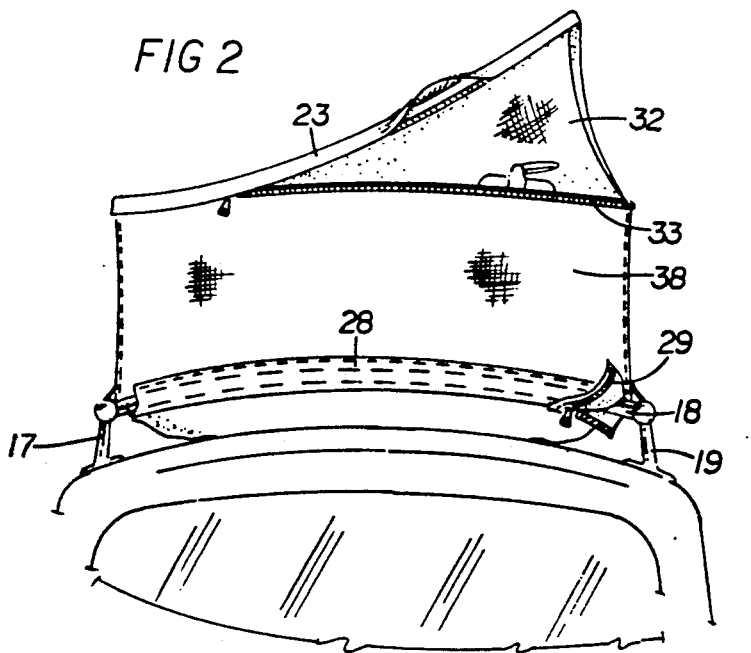
FIG. 2 is a view from the rear of the vehicle, showing the use of a zipper on the sleeve-like member utilized on the lower portion of the rear surface of the enclosure, with this view revealing that the rear rail of the cartop luggage rack may possess curvature, and also revealing that the closure means for the access opening may take the form of a zipper operable around upper locations of the plurality of vertical surfaces of the enclosure.

It is obvious that my novel enclosure 22 for luggage is not limited to use on a cartop luggage rack having only straight rails or bars, for FIG. 2 reveals that the rear sleeve-like member 28 may be utilized in conjunction with a curved rear rail 18 of the luggage rack, the left end of the rail 18 being supported by post 17 and the right end of the rail 18 being supported by a post 19. Each of these posts is of course secured to the top 10 of the vehicle. The sleeve-like member 28 is obviously created on the lower rear surface 38 of the luggage enclosure in such a way as to be properly aligned with the curved rear rail 18 of the rack, and in this instance I have utilized a zipper 29 on the rear sleeve-like member 28 in order that the rail-encompassing relationship can be readily brought about. Quite obviously I could have utilized a series of snaps on the rear sleeve-like member 28 to effect the closure of the member 28.

Also visible in FIG. 2 is the placement of the access opening 32 at the rear of the enclosure 22 rather than on the front thereof. I prefer to utilize a zipper 33 for controlling the opening and closing of the access opening, so that the user can open the access opening widely at the time of loading and unloading the luggage, in the manner shown in FIG. 5, but sliding the zipper to only a small extent if only a single item of luggage is needed. This limited sliding of the zipper 33 is particularly desirable if, for example, rain or snow is falling, and the passengers of the vehicle do not wish the bulk of the luggage to become wet.

Figure 3:
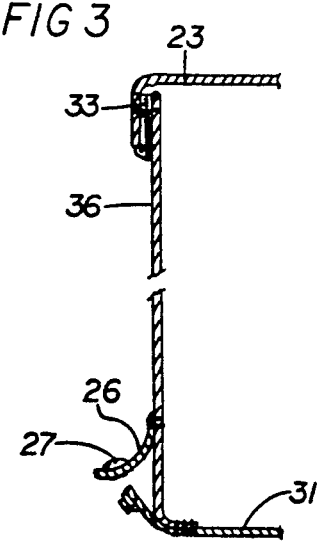
FIG. 3 is a cross-sectional view to a larger scale of a typical sidewall of my novel enclosure, revealing the placement of a longitudinally split sleeve-like member at the bottom of the sidewall, and the zipper serving as the closure means for the access opening of the container located at the upper part of the sidewall.

With reference to FIG. 3, it will be seen that this crosssectional view to a somewhat larger scale is relatable to the left side of the enclosure, as viewed in FIG. 1. Visible in FIG. 3 are portions of the top 23, the zipper 33, the side surface 36, the sleeve-like member 26, a snap 27, and a portion of the bottom 31.

Figure 4:
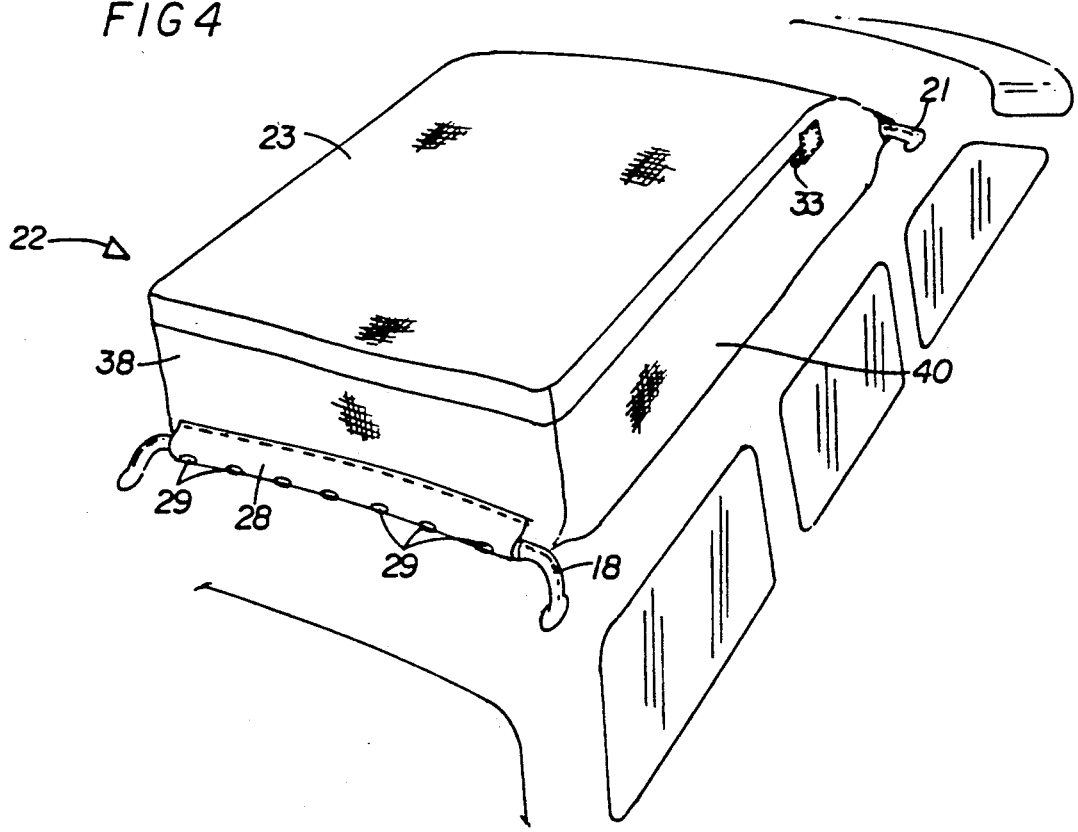
FIG. 4 is a perspective view taken from a point above the right rear corner of the vehicle, revealing the use of my novel enclosure on a luggage rack having only front and back rails, with this figure also illustrating certain attachment details and showing my novel enclosure in the closed position for travel.

In FIG. 4 I reveal certain details of the attachment of my novel enclosure to a cartop luggage rack employing front and back rails, but having no side rails. It will be noted in FIG. 4 that the enclosure 22 is in the position for travel, with the top 23 of the enclosure in closed relationship to the lower portion of the enclosure, this having been brought about by the zipper 33 having been moved around the entire extent of the access opening. Although such is not required, I typically utilize a pair of tabs or operators for the zipper 33, so that the user can have ready access to a selected side of the enclosure 22. An example of this would be if the user knew the side of the enclosure upon which a certain item was stored. The use of two tabs or operators makes it possible to open only a selected side of the enclosure, thereby making it unnecessary for the top of the enclosure to be opened to any greater extent than is truly necessary.

In FIG. 4 I have shown my novel enclosure utilizing a series of snaps 29 for closing the longitudinally-split, sleeve-like member 28, instead of a zipper being utilized on the rear member in the manner depicted in FIG. 2. This of course illustrates the point that I may utilize either of these forms of closure means, depending on the particular situation involved.

Figure 5:
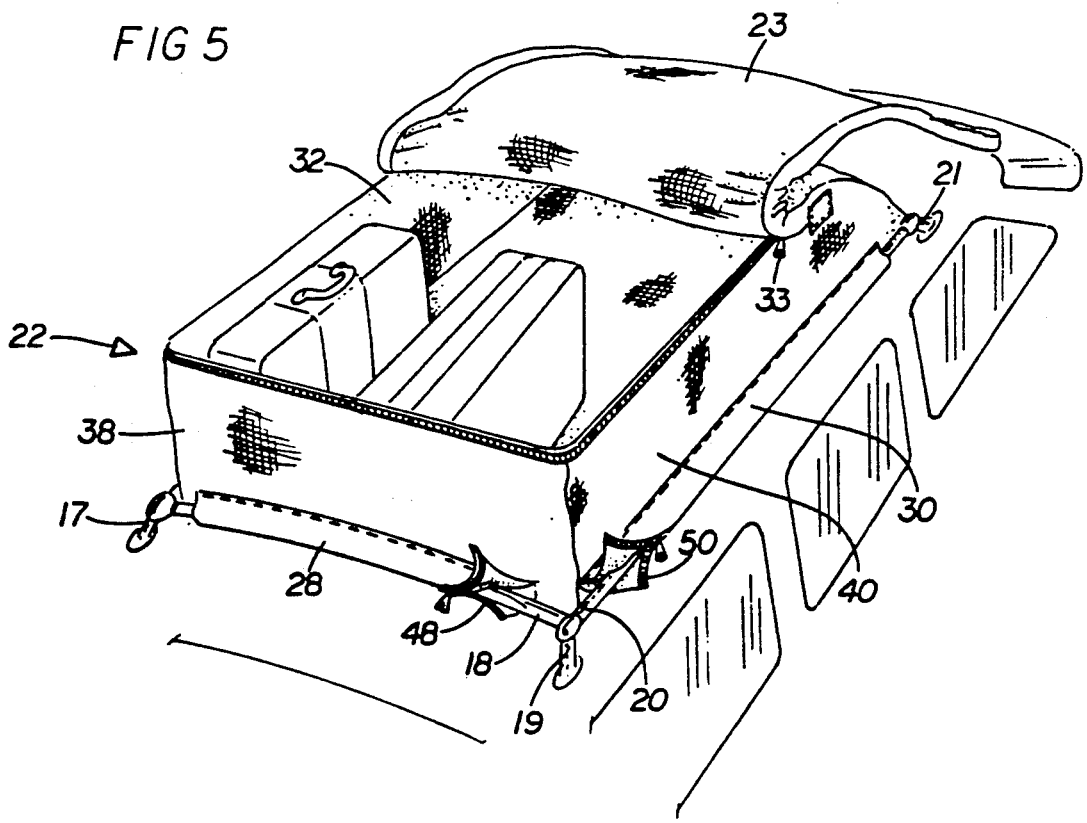
FIG. 5 is a view similar to FIG. 4 but showing a vehicle equipped with a luggage rack having front, back and side rails, in this instance with zippers utilized on each of the sleeve-like members, and with the vehicle at rest, to enable the top or closure member of the enclosure to be laid back to permit loading or unloading of luggage.

FIG. 5 closely resembles FIG. 4, but shows the zipper 33 having been moved to the fully open position, such that the top 23 can be laid all the way back, if such be desired, so that the luggage or other items can be packed in the most efficient manner from the standpoint of effective space utilization. It is also obvious that during the unpacking procedure, it may be desired to open the access opening as widely as possible, so that the user can be assured that no items are unintentionally allowed to remain in the enclosure.

FIG. 5 also depicts a cartop luggage rack having front, back and side rails, with rear rail 18 and side rail 20 being visible in this figure. This view further reveals the use of zipper 48 on the rear longitudinally-split sleeve-like member 28, and a zipper 50 used on the side sleeve-like member 30. The utilization of zippers on all four sleeve-like members may be desirable in certain instances.

I may use a wide range of different materials in the construction of the enclosure 22, and for example I may utilize canvas that has been rendered waterproof. As another example the enclosure may be made of a suitable tough plastic, that will permit folding without breaking or cracking.

The enclosure 22 could be made of semi-rigid material, but this defeats the advantage made possible by the use of flexible material that can be folded and stored in a small place. As is obvious, by making the enclosure of strong yet flexible material, it is possible for me at all times to carry my waterproof enclosure in folded condition in the vehicle, at a location affording small area storage, with this enclosure to be deployed only when desired to carry luggage, fruit, children's toys or other such items on the roof of the vehicle.

An outstanding advantage of my enclosure design is that my enclosure may be unfolded and attached to the luggage rack of the vehicle in a minute or two, for the means I utilize on the sleeve-like members for bringing them into rail-encompassing relationship can be readily manipulated, whether zippers or snaps are utilized, with no straps, ropes or any other means being necessary in order to effect the secure mounting of the enclosure to the luggage rack of the vehicle.

The enclosure may be even more rapidly removed from the luggage rack, for zippers as well as snaps can be readily manipulated into the open position, the enclosure quickly lifted off the top of the vehicle, and then folded for storage. If desired, I may put two or more handles on the upper surface of the top member 23, to enable the enclosure to be most effectively handled during the installation of the enclosure onto the vehicle, as well as during the unloading therefrom.

I claim:

1. An enclosure for use on a vehicle cartop luggage rack of the type including at least front and back rails, said enclosure comprising a generally rectangular enclosure for luggage, insertable in a space defined by the front and back rails of the luggage rack and adapted to rest at least partially on the cartop, said enclosure defined by front and back surfaces as well as side surfaces, an upper surface secured to upper edges of said front, back and side surfaces, a lower surface secured to lower edges of said front, back and side surfaces an access opening in said upper surface of said enclosure, said enclosure having rapidly operated securing means on at least its front and back surfaces, at locations approximately coinciding with the rails of the rack for securing the enclosure to said rack each of said securing means defined by first and second flap members each having one longitudinal edge thereof secured to the respective surface and an elongate zipper secured to the opposite longitudinal edge thereof whereby said first and second flap members together define a split-sleeve like member adapted to surround a respective rail of said rack, the operation of said zipper enables the user to rapidly complete the fastening of said enclosure to the rack.

2. An enclosure for use on a vehicle cartop luggage rack of the type including at least front and back rails, said enclosure comprises a generally rectangular enclosure for luggage, insertable in a space defined by the front and back rails of the rack and adapted to rest at least partially on the cartop, said enclosure defined by a flexible, watertight material having front and back surfaces as well as side surface an upper surface secured to upper edges of said front, back and side surfaces, a lower surface secured to lower edges of said front, back and side surfaces an access opening in said upper surface of said enclosure, said enclosure having securing means on at least its front and back surfaces, at locations approximately coinciding with the rails of the rack, each of said securing means defined by first and second flap members, said first flap members each having one longitudinal edge thereof secured to the respective surfaces, and said second flap members are an extension of the lower surface and rapidly operated securing means extending along the length of each of said flap members for enabling the user to rapidly complete the fastening of said securing means to the respective rail of the frame.

3. The enclosure as recited in claim 2, in which at least one of said rapidly operated securing means includes a zipper secured to the first and second flap members to secure the flap members around the respective rails.

4. The enclosure as recited in claim 2, in which at least one of said rapidly operated securing means includes a series of snaps secured to the first and second flap members to secure the flap members around the respective rails.

5. The enclosure as recited in claim 2, in which at least one of said rapidly operated securing means includes a zipper and a series of snaps secured to the first and second flap members to secure the flap members around the respective rails.

6. An enclosure for use on a vehicle cartop luggage rack of the type including an essentially rectangularly shaped frame mounted generally horizontally on a cartop in vertically spaced relation thereto, and principally constituted by front, back and side rails, said enclosure comprising a generally rectangular enclosure for luggage having four peripheral surfaces, said enclosure being insertable in the space defined by the rails of the frame and adapted to rest at least partially on the cartop, said enclosure being of flexible, watertight material having front and back surfaces as well as side surfaces, an upper surface secured to upper edges of said front, back and side surfaces, a lower surface secured to lower edges of said front, back and side surfaces, an access opening in said upper surface of said enclosure, said enclosure having securing means on all four peripheral surfaces, at locations approximately coinciding with the rails of said rectangularly shaped frame, each of said securing means defined by first and second flap members each having one longitudinal edge thereof secured to the respective surface and a rapidly operated securing means secured to the opposite edge thereof enabling the user to rapidly complete the fastening of said securing means to the respective rail of the frame.

7. The enclosure as recited in claim 6 in which at least one of said rapidly operated securing means disposed is a zipper.

8. The enclosure as recited in claim 6 in which at least one of said rapidly operated securing means disposed is a series of snaps.

9. The enclosure as recited in claim 6 in which at least one of said rapidly operated securing means is a zipper and another of said rapidly operated securing means is a series of snaps.

* * * * *